United States Patent
Hanks et al.

(10) Patent No.: US 7,768,878 B2
(45) Date of Patent: Aug. 3, 2010

(54) ACTUATOR CALIBRATION USING A FOCUS ERROR SIGNAL

(75) Inventors: Darwin M. Hanks, Fort Collins, CO (US); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 905 days.

(21) Appl. No.: 11/179,190

(22) Filed: Jul. 12, 2005

(65) Prior Publication Data

US 2007/0014202 A1    Jan. 18, 2007

(51) Int. Cl.
  *G11B 7/00*    (2006.01)
(52) U.S. Cl. .................. 369/44.11; 369/44.14; 347/224
(58) Field of Classification Search ............... 369/44.11
  See application file for complete search history.

(56) References Cited

U.S. PATENT DOCUMENTS

| | | | |
|---|---|---|---|
| 5,138,595 A * | 8/1992 | Wachi | 369/44.35 |
| 6,813,226 B2 | 11/2004 | Kadlec et al. | |
| 7,158,452 B2 * | 1/2007 | Ishibashi et al. | 369/44.29 |
| 7,283,438 B2 * | 10/2007 | Ukawa | 369/44.35 |
| 2002/0131346 A1 | 9/2002 | Turner | |
| 2004/0240372 A1 | 12/2004 | Sasaki | |
| 2005/0135216 A1 * | 6/2005 | Chang et al. | 369/53.25 |
| 2005/0169119 A1 * | 8/2005 | Van Brocklin et al. | 369/30.27 |
| 2006/0023593 A1 * | 2/2006 | Anderson et al. | 369/53.1 |

FOREIGN PATENT DOCUMENTS

| | | |
|---|---|---|
| EP | 1308938 | 5/2003 |
| WO | WO -02/067250 * | 8/2002 |
| WO | WO 2006/073693 | 7/2008 |

OTHER PUBLICATIONS

International Search Report dated Nov. 1, 2006 for PCT/US2006/026425, Hewlett-Packard (2 pages).

* cited by examiner

*Primary Examiner*—Lixi Chow (57) ABSTRACT

A lens actuator is calibrated by inputting a signal to the actuator to cause the actuator to move a lens from a first location to a second location, sensing a focus error signal generated in response to the movement of the lens, determining a distance moved by the lens in going from the first location to the second location from a predetermined characteristic of the focus error signal, and determining a gain of the actuator from the input signal and the distance moved.

34 Claims, 5 Drawing Sheets

ACTUATOR CALIBRATION USING A FOCUS ERROR SIGNAL

BACKGROUND

Optical discs, such as compact discs (CDs) and digital versatile discs (DVDs), are a form of computer-readable media that provide storage for digital information. Some optical discs may be read-only, while others may also be written to. Typically, one side of an optical disc is referred to as a data side, while the other side is referred to as a label side. The label side may include label text and/or graphics.

An optical disc drive is used to read from and, in some cases, to write to the data side of an optical disc. An optical pickup unit is included in the optical disc drive and is configured with a laser and sensors for reading from and writing to the data side. An optical pickup unit may also be configured for writing to the label side. However, writing to the label side may involve using a larger laser spot size to write on the label side than on the data side because the tracks written to the label side are generally wider than are commonly written on the data side. Therefore, writing to the label side often involves defocusing the laser spot to make it larger. One problem that may occur with this is controlling the defocusing so as to optimally adjust the spot size.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
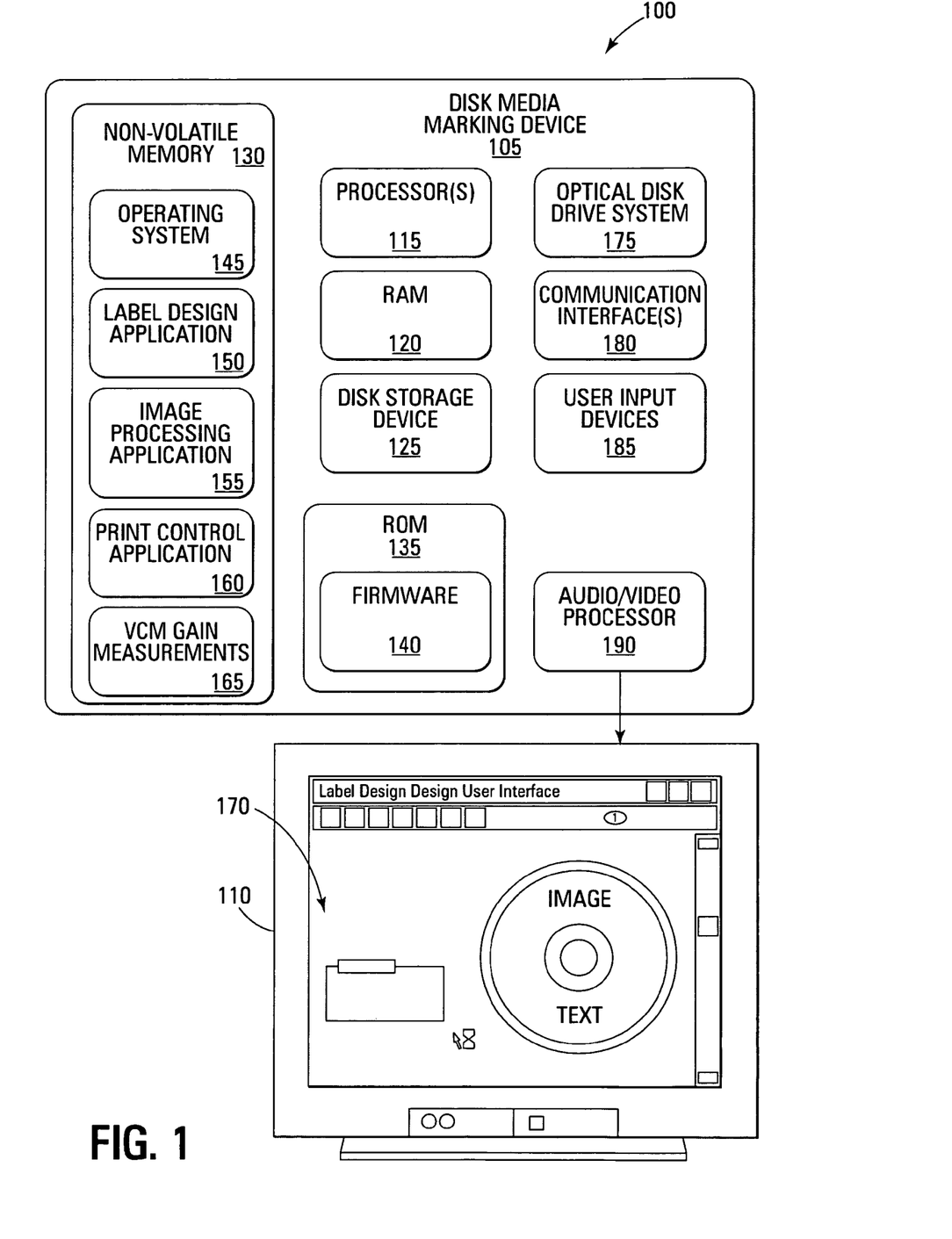
FIG. 1 is a block diagram of an embodiment of an exemplary disc media marking system, according to an embodiment of the present invention.

FIG. 1 shows an exemplary disc media marking system 100 suitable for measuring and calibrating input voltage values of an actuator, such as a voice coil motor (VCM), according to an embodiment. The marking system 100 includes a disc media marking device 105 and a display device 110. The disc media-marking device 105 may be implemented as a stand-alone appliance device for labeling disc media. Alternatively, the disc media marking device 105 may be integrated as part of an optical media player, recorder, or computer peripheral drive, such as a writable compact disc (CD) player or a drive implemented to label an optical disc as well as record data onto a CDR (CD recordable disc) and/or CD-RW (CD-rewritable disc). The disc media may also be integrated as part of a digital versatile disc (DVD) player or recorder that is implemented to label an optical disc as well as record data onto a DVD-R, DVD+R, DVD-RW, DVD+RW disc, or the like. Such writable optical devices may include, for example, a stand-alone audio CD player that is a peripheral component of an audio system, a CD or DVD drive integrated as standard equipment in a PC (personal computer), a DVD (digital versatile disc) player and/or recorder, and any number of similar embodiments. The device 105 may be used to read from and may write to a data region, such as a data side of an optical disc. An optical pickup unit (OPU), included within the optical device, is configured with a laser and sensors adapted for reading and writing data.

Disc media marking device 105 typically includes one or more processors 115 (e.g., any of microprocessors, controllers, and the like) that process various instructions to control the operation of disc media marking device 105 and communicate with other electronic and computing devices. Disc media marking device 105 may be implemented with one or more memory components, examples of which include a random access memory (RAM) 120, a disc storage device 125, and a computer-usable medium, such as nonvolatile memory 130, (e.g., any one or more of a read-only memory (ROM) 135, flash memory, EPROM, EEPROM, etc.).

Disc storage device 125 may include any type of magnetic or optical storage device, such as a hard disc drive, a magnetic tape, a recordable and/or rewriteable compact disc (CD), a DVD, DVD+RW, and the like. The one or more memory components provide data storage mechanisms to store various information and/or data, such as configuration information for disc media marking device 105, graphical user interface information, and any other types of information and data related to operational aspects of disc media marking device 105. Alternative implementations of disc media marking device 105 may include a range of processing and memory capabilities, and may include any number of differing memory components than those shown in FIG. 1.

Disc media marking device 105 may include a firmware component 140 that is implemented as a permanent memory module stored on ROM 135, or with other components in disc media marking device 105, such as a component of, a processor 115. Firmware 140 is programmed and distributed with disc media marking device 105 to coordinate operations of the hardware within disc media marking device 105 and contains programming constructs used to perform such operations.

An operating system 145 and one or more application programs may be stored in nonvolatile memory 130 and executed on processor(s) 115 to provide a runtime environment. A runtime environment facilitates extensibility of disc media marking device 105 by allowing various interfaces to be defined that, in turn, allow the application programs to interact with disc media marking device 105. In this example, the application programs include a label design application 150, an image processing application 155, and a print control application 160. Furthermore, it is contemplated that VCM gain measurements 165 are stored in non-volatile memory, such as nonvolatile memory 130. In certain embodiments, VCM gain measurements 165 are stored in non-volatile sections of RAM 130 or ROM 135. VCM gain measurements are inherent to the particular VCM, and specifically related to the metal used in the VCM windings and the number of windings of the VCM and the temperature at which the measurement was made.

The label design application 150 generates a label design user interface 170 for display on display device 110 from which a user may create a label image to be rendered on a disc media, such as on an optical disc. A user may specify text, a bitmap image for background, a digital photo, a graphic or symbol, and/or any combination thereof to create the label image on the user interface 170.

The image processing application 155 processes the label image created with the label design user interface 170 to produce a data stream of label image data and laser control data for labeling the image on concentric circular or spiral tracks of a disc media (i.e., an optical disc). For example, a continuous tone RGB (red, green, and blue) rectangular raster graphic of the label image may be color mapped and separated into the printing color channels KCMY (black, cyan, magenta, and yellow) or grayscale, and then halftoned and converted to tracks. This data stream may be formatted as laser control data and may be augmented with other control commands to control the disc media marking device 105 rendering a label on the disc media.

A label file may be generated using image processing application 155. The label file is communicated to a controller 260 (FIG. 2) by print control application 160 that parses the label file to control a labeling mechanism. Alternatively, the concentric circular tracks may be generated and streamed to the disc media marking device 105, one track at a time for processing and labeling, through print control application 160.

The print control application 160 determines the radius from the hub of the disc of the first track, and the subsequent track spacing. After the radius of the first track and the track spacing are determined, the print control application 160 determines which label image data will correspond to each respective track. The laser mark locations along a particular track are specified in a coordinate system where the concentric circular tracks are defined in coordinates of the radial distance and the distance along each respective track.

Disc media marking device 105 includes an optical disc drive (ODD) system 175 that may be configured to produce visible marks on a surface of a disc media (i.e., optical disc), so as to produce a label image on a label region (for example, a label side) of the optical disc. In one embodiment, the label region has an electromagnetic radiation-sensitive coating disposed on the disc. Optically visible marks may be formed at desired locations of the label region by application of laser energy of a specified frequency, power, and duration to the desired locations. One such suitable media is as described in U.S. Patent Application Publication No. 2003/0108708 A1, for example. The ODD system 175 is described in greater detail herein below with reference to FIG. 2.

Disc media marking device 105 may further include one or more communication interfaces 180 that may be implemented as any one or more of a serial and/or parallel interface, as a wireless interface, any type of network interface, and as any other type of communication interface. A wireless interface enables disc media marking device 105 to receive control input commands and other information from an input device, such as a remote control device or from other infrared (IR), 802.11, Bluetooth, or similar RF input device. A network interface provides a connection between disc media marking device 105 and a data communication network to send label image data and other information to disc media marking device 105 via the network. Similarly, a serial and/or parallel interface provides a data communication path directly between disc media marking device 105 and another electronic or computing device.

Disc media marking device 105 may include user input devices 185 that may include a keyboard, pointing device, selectable controls on a user control panel, and/or other mechanisms to interact with and to input information to disc media marking device 105. Disc media marking device 105 also includes an audio/video processor 190 that generates display content for display on display device 110 and generates audio content for presentation by a presentation device, such as one or more speakers (not shown). The audio/video processor 190 may include a display controller that processes the display content to display corresponding images on display device 110. A display controller may be implemented as a graphics processor, microcontroller, integrated circuit, and/or similar video-processing component to process the images. Video signals and audio signals may be communicated from disc media marking device 105 to display device 110 via an RF (radio frequency) link, S-video link, composite video link, component video link, or other similar communication link.

Although shown separately, some of the components of disc media marking device 105 may be implemented in an application specific integrated circuit (ASIC). Additionally, a system bus (not shown) typically connects the various components within disc media marking device 105. A system bus may be implemented as one or more of any of several types of bus structures, including a memory bus or memory controller, a peripheral bus, an accelerated graphics port, or a local bus using any of a variety of bus architectures. Furthermore, disc media marking device 105 may share a system bus with a host processor.

Figure 2:
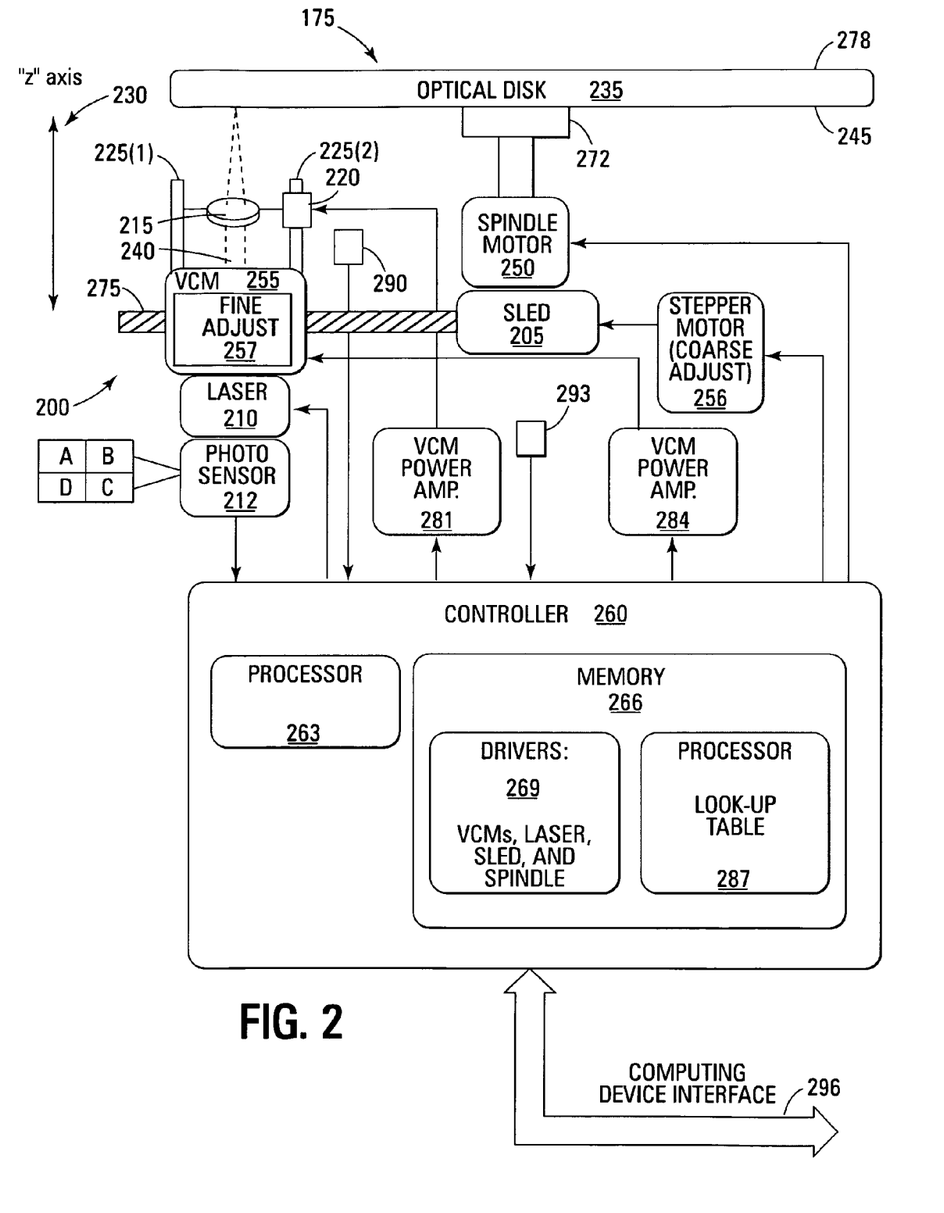
FIG. 2 is a block diagram of an exemplary embodiment of an optical disc drive system of a disc media marking system, according to another embodiment of the present invention.

FIG. 2 is a block diagram of an exemplary embodiment of the ODD system 175 shown in FIG. 1, according to an embodiment. The ODD system 175 includes an optical pickup unit (OPU) assembly 200 that includes a sled 205, a laser 210, a photo sensor 212, focal optics (or lens) 215 and an actuator. In one embodiment, the actuator may be a voice coil motor (VCM) 220. The VCM 220 responds to an input signal (voltage or current) to cause the lens 215 to move the focal point of a laser beam generated by laser 210.

For purposes of illustration, the lens 215 is carried by lens supports 225(1), 225(2). The lens 215 is configured for travel (i.e., adjustment of the focal point) along a z-axis 230 perpendicular to a surface of an optical disc 235. Photo sensor 212 determines a distance along z-axis 230 at which an "in focus" condition of the laser beam exists with respect to a particular location on the surface of optical disc 235. VCM 220 is calibrated to move to this particular distance by receiving a particular input signal.

However, in some embodiments, it may be desirable to further adjust the z-axis position so as to intentionally defocus the laser beam. This intentional defocusing, or "focus offset," may be provided in order to provide a better image quality using a marking laser. For example, the size of the visible spots created by a focused laser may be too small to allow efficient labeling, so a defocused laser beam may be used to created larger visible spots. Or the marking laser may create such distortion from its heat when marking a surface, as to provide a need for an adjusted focus offset. A predetermined amount of focus offset may be achieved by adjusting the input signal by a corresponding focus offset value.

A laser beam 240 is generated by the laser 210 and directed onto (reflected on) a label side surface 245 of optical disc 235. The laser beam 240 creates visible laser marks that correspond to label image data to produce an image of the label side 245 of the optical disc 235.

The ODD system 175 includes a spindle motor 250, a VCM (or sled motor) 255, and a controller 260. For one embodiment, controller 260 includes an analog-to-digital converter and a digital-to-analog converter. VCM 255 moves OPU assembly 200 adjacent to particular radial positions or tracks of optical disc 235. VCM 255 is calibrated to move to this particular distance by receiving a particular input signal. VCM 255 may be referred to as a sled or radial VCM since it provides movement in the radial direction. VCM 255 may be calibrated for gain, i.e., input signal (e.g., milivolts) per movement (microns), such that, for example, a particular number of milivolts results in a movement of a particular distance.

A separate stepper motor 256 provides a coarse adjustment for radial movement, and particularly is calibrated to move per a step size increment as instructed by controller 260. VCM 255 includes a fine adjust feature 257. While stepper motor 256 is calibrated to move per a step size increment, fine adjust feature 257 is calibrated to adjust to a finer increment. For example, if stepper motor 256 is calibrated for a step size of 120 microns, and fine adjust feature 257 is calibrated for a smaller increment, when 80 microns of movement is requested, stepper motor 256 moves the sled 205 by 120 microns, and fine adjust feature 257 moves the sled 205 back by 40 microns.

In general, controller 260 may be implemented as a printed circuit board employing a combination of various components discussed above with respect to the disc media marking system 100 of FIG. 1. Accordingly, controller 260 typically includes a processor 263 for processing computer/processor-readable instructions from various components stored in a computer usable medium, such as a memory 266. Processor 263 is typically one or more of the processors 115 discussed above with respect to the disc media marking system 100 of FIG. 1. Likewise, memory 266 is typically the non-volatile memory 130 and/or firmware 140 of disc media marking system 100 of FIG. 1. For other embodiments, memory 266 includes removable or non-removable optical or magnetic media.

Drivers 269, including a laser driver, sled driver, and spindle driver are stored in memory 266 and executable on processor 263. Although these components are represented in the FIG. 2 embodiment as software components stored in memory 266 and executable on processor 263, they may also be implemented as firmware or hardware components.

In general, a spindle driver drives the spindle motor 250 to control a rotational speed of optical disc 235 via a spindle 272. The spindle driver operates in conjunction with a sled diver that drives the VCM 255 to control radial (track) positioning of OPU assembly 200 with respect to disc 235 along a sled drive mechanism 275. In a labeling implementation, the sled 205 of the OPU assembly 200 is moved along the sled drive mechanism 275 to various radii (track) positions of optical disc 235.

In a labeling implementation, the rotational speed of disc 235 and the radial position of OPU assembly 200 are controlled such that laser marks are written at desired positions on the disc 235 as the label side surface 245 moves past the laser beam 240.

A laser driver controls the activation and intensity of laser beam 240 to write laser marks corresponding to a label image onto the label side surface 245. Additionally, the laser driver controls the activation and intensity of the laser beam 240 to read data maintained on the data side 278 of the optical disc 235 when the disc is positioned such that the data side 278 passes over the laser beam 240. While in some embodiments the data region and the label region are on opposite sides of the disc, in other embodiments the data region and the label region are located on the same side of the disc.

A driver for VCM 220 is included among the drivers 269. The VCM driver is executable on processor 263 to adjust a VCM power amplifier 281 that provides an input to VCM 220. Furthermore, another driver is included for VCM 255 executable on processor 263 to adjust a VCM power amplifier 284 that provides an input to VCM 255. Input signals may be either current or voltage. As discussed, VCMs 220 and 255 may be calibrated at a particular operating temperature, for one embodiment. Therefore, input signals are based on the particular calibrated operating temperature. However, operating the OPU assembly at temperatures other than the calibrated operating temperature may result in different distances for a given input signal from the VCMs 220 and 255.

Computing device interface 296 interfaces the controller 260 of the ODD system 175 with another electronic or computing device to receive label image data or a label file (not shown). The computing device interface 296 can be implemented as an ATAPI (Advanced Technology Attachment Packet Interface) that is one of many small computer parallel or serial device interfaces. Another common computer interface is SCS1 (small computer system interface) that is a generalized device interface for attaching peripheral devices to computers. SCS1 defines the structure of commands the way commands are executed and the way status is processed. Various other physical interfaces include the Parallel Interface, Fiber Channel, IEEE 1394. USB (Universal Serial Bus), and ATNATAPI. ATAP1 is a command execution protocol for use on an ATA interface so that CDROM and tape drives can be connected via the same ATA cable with an ATA hard disc drive. ATAPI devices generally include CDROM drives, CD-recordable drives, CD-rewritable drives, DVD (digital versatile disc) drives, tape drives, super floppy drives (e.g., ZIP and LS1ZO), and the like.

Photo sensor 212 provides laser focus feedback to the laser driver. For one embodiment, photo sensor 212 is an astigmatic sensor and includes four sensor quadrants: quadrants A, B, C, and D, as shown in FIG. 2. Quadrants A, B, C, and D are configured to measure reflected light from optical disc 235 after passing through lens 215 independent of each other. In one particular embodiment, voltage is measured by the quadrants A, B, C, and D.

Figure 3:
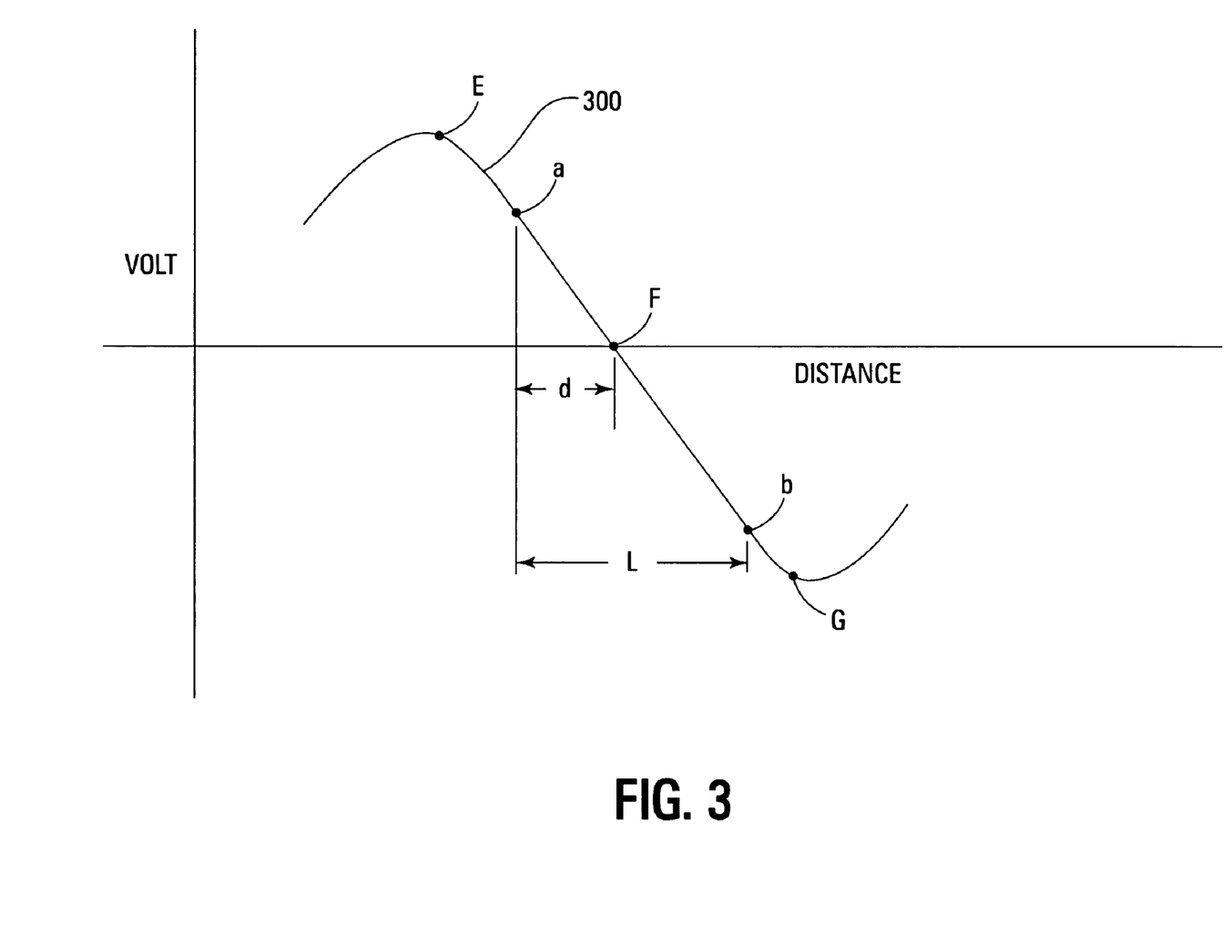
FIG. 3 is a plot of an exemplary focus error signal (FES), according to another embodiment of the present invention.

FIG. 3 is a plot 300 of an exemplary focus error signal (FES), according to an embodiment, output by photo sensor 212 in response to light being reflected onto photo sensor 212 from optical disc 235 after the light passes through lens 215 as lens 215 is moved along the z-axis of FIG. 2 by VCM (or actuator) 220. When lens 215 is at a location on the z-axis that places the laser beam in focus, the focus error is zero, and the focus error signal goes to zero at point F of FIG. 3. Moving lens 215 toward optical disc 235 from focus or away from optical disc 235 from focus respectively causes the voltage output to increase or decrease substantially linearly toward a voltage maximum (or peak) at point E or a voltage minimum (or valley) at point G. The focus error signal is the voltage corresponding to the light received at quadrants A and C minus the voltage corresponding to the light received at quadrants B and D of photo sensor 212. For one embodiment, dependence of the focus error signal on the intensity of the light can be removed by dividing it by the sum of the voltages corresponding to the light received at quadrants A, B, C, and D, i.e., the voltage corresponding to all of the light received at photo sensor 212.

Controller 260 uses the focus error signal to determine whether lens 215 is in focus and, when reading to or writing from the data region, to keep lens 215 in focus. At distances closer to optical disc 235 than the distance corresponding to point E, and distances further from optical disc 235 than the distance corresponding to point G, the focus error signal is not valid. Therefore, the substantially linear portion of the focus error signal can be referred to as its useful region. For one embodiment, the distance axis in FIG. 3 is in microns.

The extent of the linear region and the distance from center of the maximum and minimum are functions of the design of the optical path and remain fairly constant for a given drive design. Therefore, the gain value that relates the distance moved by the lens to the voltage of FES in the linear region can be characterized for a drive design and stored in non-volatile memory. This characterization can be done in the factory using a means of measuring the distance moved by the lens and the voltage at FES.

For one embodiment, controller 260 uses the focus error signal to determine whether lens 215 is in focus and to keep lens 215 in focus using a feedback control system, where the focus error signal is fed through a compensator, e.g., located in processor 263, VCM power amplifier 281, and then into VCM 220. For another embodiment, this can be done without feedback if care is taken to reduce mechanical noise that might move VCM 220 outside the linear region of the FES signal.

For one embodiment, an equation of the focus error signal, e.g., in the substantially linear region between points E and G, can be determined by moving lens 215 to a number of locations along the z-axis, recording the corresponding output voltages of photo sensor 212, and fitting a curve, such as a least squares curve, through the voltage versus location (or distance) data. For another embodiment, the raw data or data generated by the equation may be stored in a look-up table, such as look-up table 287 in FIG. 2, of the voltage output of photo sensor 212 versus the distance from optical disc 235 of lens 215. For another embodiment, voltage output of photo sensor 212 versus the distance from optical disc 235 can be used to determine a gain of the focus error signal.

Figure 4:
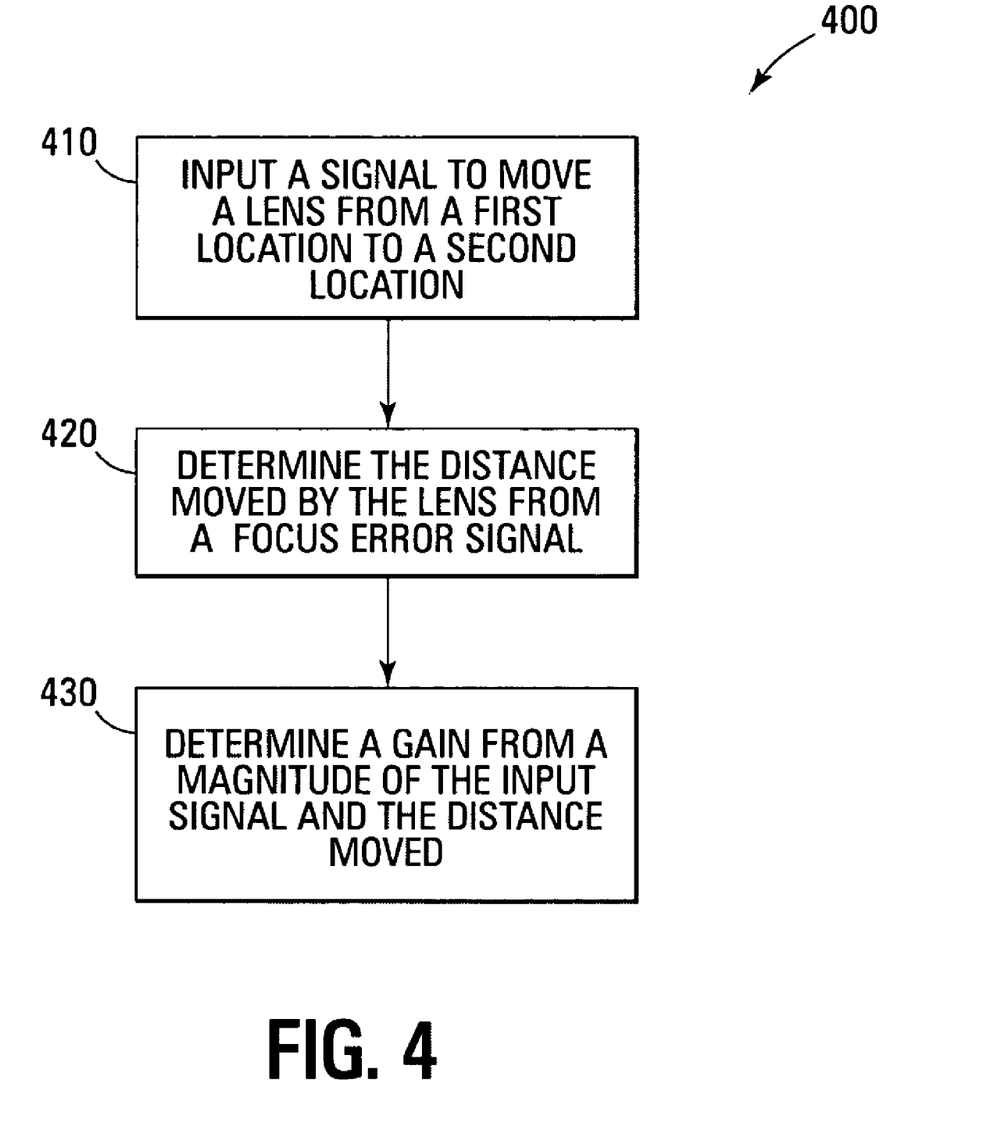
FIG. 4 is a flowchart of an embodiment of a method for calibrating an actuator, according to another embodiment of the present invention.

FIG. 4 is a flowchart of a method 400 for calibrating VCM (or actuator) 220, according to an embodiment. At block 410, VCM power amplifier 281 inputs a signal (voltage or current) to VCM 220 causing lens 215 to move from a first location, e.g., the focus location, such as corresponding to the point F of FIG. 3, to a second location, e.g., corresponding to point a of plot 300 of FIG. 3, which corresponds to an out of focus location. As a result of the displacement from the focus location, the FES output signal assumes a non-zero value corresponding to the displacement. At block 420, the equation of the focus error signal that defines the relationship between voltage and distance, or for some embodiments, the gain of the focus error signal, can be used to determine the distance moved by the lens from the voltages indicated by photo sensor 212 corresponding to the first and second locations, e.g., the distance d between points F and a in FIG. 3. For example, the change in FES signal can be multiplied by the FES gain (e.g. in micrometers/V) to determine the distance of movement (e.g. in micrometers). At block, 430, the gain of VCM 220 is determined from the magnitude of the signal (voltage or current) that was previously applied to move lens 215 by the distance; e.g., the gain of VCM 220 is equivalent to the input signal (voltage or current) divided by the distance moved, e.g., the distance d. The method 400 may be performed or repeated at the operating temperature of the drive so as to account for temperature-related changes in the gain of VCM 220 and/or other components.

For one embodiment, VCM power amplifier 281 adds an offset signal (voltage or current), at block 410, to a feedback control signal coming from the compensator and the sum of these signals is inputted to the VCM 220, and at block, 430, the gain of VCM 220 is determined from the magnitude of the offset signal.

For one embodiment, controller 260 may be programmed to maintain the output of photo sensor 212, e.g., the focus error signal, at a particular set point, such as the point F of FIG. 3, corresponding to lens 215 being at the focus location. For this embodiment, controller 260 instructs VCM power amplifier 281 to input a voltage (or current) to VCM 220 for positioning lens 215 such that photo sensor 212 outputs a voltage to controller 260 that corresponds to the set point. This can be used to calibrate VCM 220, for another embodiment.

For example, controller 260 can be set to maintain the focus error signal at an offset point, e.g. point a of plot 300, relative to the set point F. A plot, a look-up table, gain, or equation of the focus error signal can be used to determine the distance d between set point F and offset point a, in FIG. 3. Note that the distance d corresponds to the distance that lens 215 would have to move from focus so that photo sensor 212 outputs a voltage corresponding to the voltage at offset point a. With the offset point selected, controller 260 instructs VCM power amplifier 281 to input a voltage (or current) to VCM 220 to move lens 215 to the location from focus that produces the offset voltage from photo sensor 212 that corresponds to point a. Note that this distance is the distance d of FIG. 3. This can be repeated for a number of offset voltages, for another embodiment. For other embodiments, the offset voltages could oscillate, e.g., sinusoidally, in time. That is, lens 215 would oscillate. For one embodiment, the oscillation frequency can be about 10 to about 50 Hz. Subsequently, a gain of VCM 220 may be determined from the voltage (or current) input to VCM 220 from VCM power amplifier 281 divided by the distance d moved from focus. When using a number of offset voltages, the gain could be an average value for another embodiment.

Figure 5:
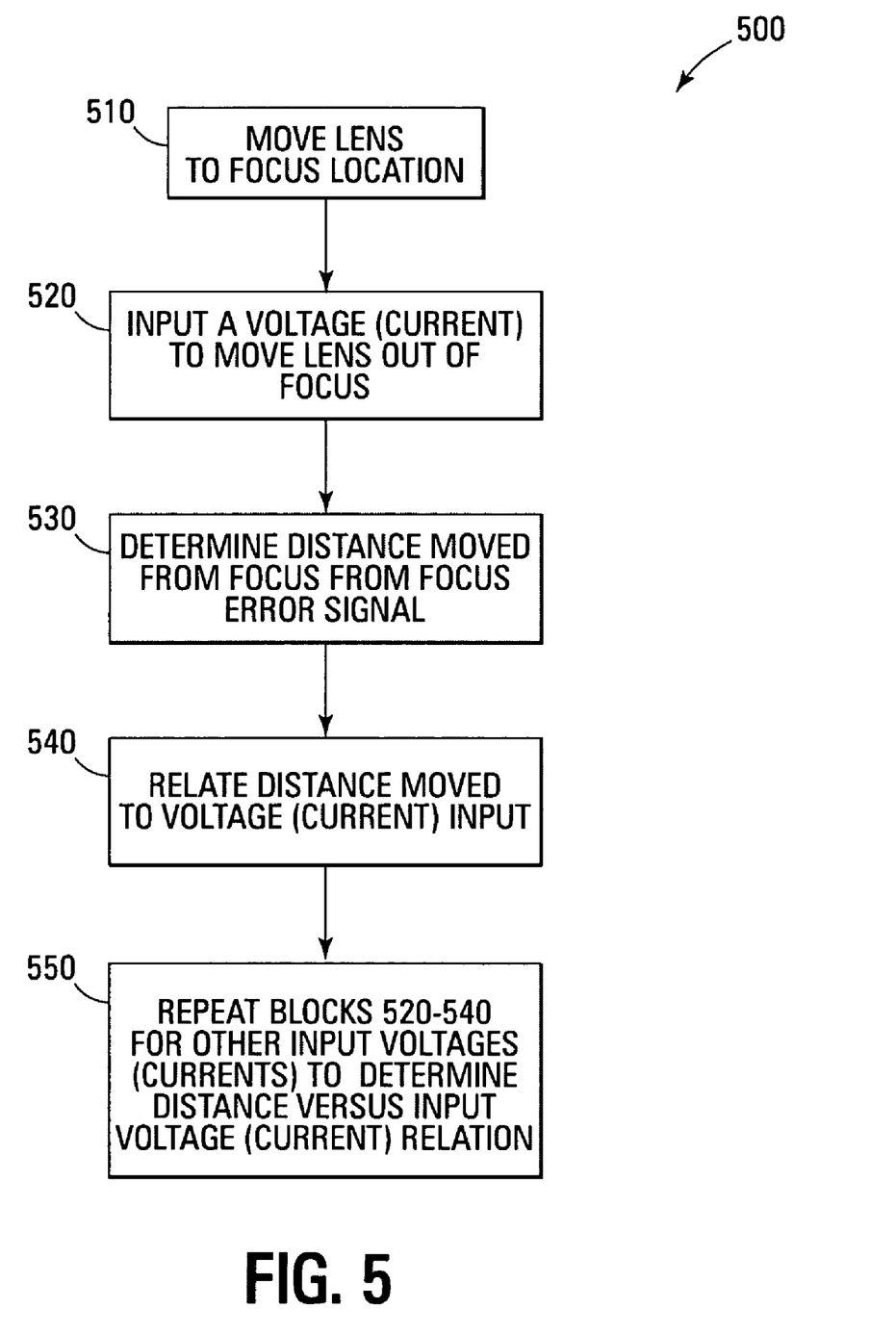
FIG. 5 is a flowchart of another embodiment of a method for calibrating an actuator, according to another embodiment of the present invention.

FIG. 5 is a flowchart of a method 500 for calibrating VCM (or actuator) 220, according to an embodiment. At block 510, VCM power amplifier 281 inputs a first voltage (or current) to VCM 220 to move lens 215 to the focus location, e.g., corresponding to point F of FIG. 3. VCM power amplifier 281 inputs a second voltage (or current) to VCM 220 to move lens 215 out of focus, e.g., to a location corresponding to point a on the focus error signal in FIG. 3, at block 520. The distance moved from the focus point e.g., the distance d, is determined at block 530 from an equation, gain, or look-up table of the focus error signal,. This distance is then related to the second voltage (or current) input to VCM 220 at block 540. At block 550, blocks 520-540 of method 500 are repeated for other input voltages (or currents) to determine a distance versus input voltage (or current) relation, e.g., from a least squares curve fit of the distance versus input voltage (or current). For example, a third voltage (or current) is input to VCM 220 to move lens 215 from the location corresponding to point a on plot 300 to a location b on plot 300, and the distance L moved by lens 215 (FIG. 3) is related to the third voltage (or current) and so on. For one embodiment, the distance versus voltage (or current) relationship so determined is used when defocusing lens 215 for forming labels on the label sides of optical discs, as described above.

CONCLUSION

Although specific embodiments have been illustrated and described herein it is manifestly intended that the scope of the claimed subject matter be limited only by the following claims and equivalents thereof.

What is claimed is:

1. A method of calibrating a lens actuator, comprising:
inputting an oscillating signal into the actuator, causing the actuator to oscillate a lens, wherein oscillation frequency of the lens is about 10 to about 50 Hz;
sensing a focus error signal generated in response to the oscillation of the lens;
determining distances from a reference location to the oscillating lens from a predetermined characteristic of the focus error signal; and
determining a relationship between the oscillating signal and the determined distances from the reference location to the oscillating lens.

2. The method of claim 1, wherein inputting an oscillating signal to the actuator comprises inputting an oscillating voltage or a current signal to the actuator.

3. The method of claim 1, wherein determining distances from the reference location to the oscillating lens from the predetermined characteristic of the focus error signal comprises using voltage outputs of a photo sensor in response to respectively receiving light that passes through the oscillating lens and is reflected off a surface onto the photo sensor when the lens is at the distances from the reference location.

4. The method of claim 1, wherein the reference location corresponds to an in-focus location of the lens.

5. The method of claim 1, wherein the focus error signal is generated from reflecting light from a surface onto an astigmatic photo sensor after passing the light through the lens at different distances of the lens from the surface, wherein the astigmatic photo sensor outputs different voltages respectively corresponding to the different distances of the lens from the surface.

6. The method of claim 5, wherein the surface is a surface of an optical disc.

7. The method of claim 1, wherein the distances from the reference location to the lens correspond to offset points of the focus error signal.

8. A method of operating a disc drive, comprising:
applying an oscillating signal to an actuator that causes the actuator to oscillate a lens, wherein the oscillation frequency of the lens is about 10 to about 50 Hz;
outputting an oscillating voltage from an astigmatic photo sensor in response to passing light from a light source through the oscillating lens and onto the astigmatic photo sensor after reflecting it from a surface of an optical disc;
determining distances from a focus point of the lens to the lens from the oscillating output voltage and a relationship determined for a focus error signal output by the astigmatic photo sensor; and
determining a relationship between the oscillating signal applied to the actuator and the distances from the focus point of the lens to the oscillating lens.

9. The method of claim 8, further comprising:
using the determined relationship to set the lens at a position where the lens is defocused; and
forming a label on the surface of the optical disc using light, from the light source, that is passed through the defocused lens.

10. The method of claim 8, wherein a portion of the focus error signal is substantially a linear function of a distance between the surface of the disc and the lens and a voltage output of the photo sensor.

11. The method of claim 8, wherein applying an oscillating signal to the actuator comprises applying an oscillating voltage or a current signal to the actuator.

12. An optical disc drive comprising:
means for generating an oscillating input signal;
means for oscillating a lens in time at an oscillation frequency in response to the oscillating input signal, wherein the oscillation frequency is about 10 to about 50 Hz;
means for generating a focus error signal in response to the oscillation of the lens;
means for determining distances from a reference location to the oscillating lens from a predetermined characteristic of the focus error signal; and
means for determining a relationship between the oscillating input signal and the determined distances from the references location to the oscillating lens.

13. The optical disc drive of claim 12 further comprises:
means for setting the lens at a position where the lens is defocused using the determined relationship; and
means for forming a label on a surface of an optical disc using light that is passed through the defocused lens.

14. The optical disc drive of claim 12 further comprises a means for reading an optical disc and/or writing to the optical disc.

15. An optical disc drive comprising:
a lens actuator;
a lens connected to the lens actuator; and
a controller electrically coupled to the lens actuator, the controller adapted to cause the optical disc drive to
input an oscillating input signal to the actuator, causing the actuator to oscillate at an oscillation frequency, wherein the oscillation frequency is about 10 to about 50 Hz;
sense a focus error signal generated in response to the oscillation of the lens;
determine a distances from a reference location to the oscillating lens from a predetermined characteristic of the focus error signal; and
determine a relationship between the oscillating input signal and the determined distances from the references location to the oscillating lens.

16. The optical disc drive of claim 15, wherein the oscillating input signal input to the actuator comprises an oscillating voltage or a current signal.

17. The optical disc drive of claim 15 further comprises an astigmatic photo sensor optically coupleable to an optical disc and electrically coupled to the controller, the photo sensor adapted to generate the focus error signal in response to receiving light that passes through the lens and is reflected off the optical disc.

18. The optical disc drive of claim 17, wherein determination of the distances from the reference location to the oscillating lens from the predetermined characteristic of the focus error signal comprises using voltage outputs of the photo sensor in response to respectively receiving light that passes through the oscillating lens and is reflected off the optical disc when the oscillating lens is at the distances from the reference location.

19. The optical disc drive of claim 15, wherein the reference location corresponds to an in-focus location of the lens.

20. The optical disc drive of claim 15 further comprises an input signal source electrically coupled between the controller and actuator for sending the oscillating input signal to the actuator.

21. The optical disc drive of claim 15, wherein the controller is further adapted to cause to optical disc drive to:
use the determined relationship to set the lens at a position where the lens is defocused; and
form a label on an optical disc using light that is passed through the defocused lens.

22. The optical disc drive of claim 15, wherein the each of distances from the reference location to the oscillating lens corresponds to an offset point of the focus error signal, wherein the lens is out of focus at each offset point of the focus error signal.

23. The optical disc drive of claim 22, wherein the controller is adapted to maintain the lens at an offset point of the focus error signal while forming a label on an optical disc.

24. An optical disc drive comprising:
an input signal source;
a lens actuator electrically coupled to the input signal source;
a lens connected to the lens actuator;
a light source;
an astigmatic photo sensor optically coupleable to an optical disc, the photo sensor adapted to generate a focus error signal for the lens in response to receiving light, from the light source, that passes through the lens and is reflected off the optical disc; and
a controller electrically coupled to the photo sensor and the input signal source, the controller adapted to cause the optical disc drive to perform a method comprising:
sending an oscillating signal to the actuator from the input signal source that causes the actuator to oscillate the lens at an oscillation frequency, wherein the oscillation frequency is about 10 to about 50 Hz;
outputting an oscillating voltage from the photo sensor in response to passing light, from the light source, through the lens and onto the photo sensor after reflecting it off the optical disc;
determining distances from a focus point of the lens to the lens from the oscillating output voltage and a relationship determined for the focus error signal output by the astigmatic photo sensor; and
determining a relationship between the oscillating signal sent to the actuator and the distances from the focus point of the lens to the oscillating lens.

25. The optical disc drive of claim 24, wherein the method further comprises:
using the determined relationship to set the lens at a position where the lens is defocused; and
forming a label on the optical disc using light, from the light source, that is passed through the defocused lens.

26. The optical disc drive of claim 24, wherein a portion of the focus error signal is substantially a linear function of a distance between the optical disc and the lens and the voltage output of the photo sensor.

27. The optical disc drive of claim 24, wherein, in the method, sending an oscillating signal to the actuator from the input signal source comprises sending an oscillating voltage or current signal to the actuator from the input signal source.

28. A computer-usable medium containing computer-readable instructions for causing an optical disc drive to perform a method comprising:
inputting an oscillating signal into an actuator, causing the actuator to oscillate a lens, wherein oscillation frequency of the lens is about 10 to about 50 Hz;
sensing a focus error signal generated in response to the oscillation of the lens;
determining distances from a reference location to the oscillating lens from a predetermined characteristic of the focus error signal; and
determining a relationship between the oscillating signal and the determined distances from the reference location to the oscillating lens.

29. The non-transitory computer-usable medium of claim 28, wherein, in the method, inputting an oscillating signal to the actuator comprises inputting an oscillating voltage or a current signal to the actuator.

30. The non-transitory computer-usable medium of claim 28, wherein, in the method, determining distances from the reference location to the oscillating lens from the predetermined characteristic of the focus error signal comprises using voltage outputs of a photo sensor in response to respectively receiving light that passes through the lens and is reflected off an optical disc onto the photo sensor when the lens is at the distances from the reference location.

31. The non-transitory computer-usable medium of claim 28, wherein, in the method, the reference location corresponds to an in-focus location of the lens.

32. The non-transitory computer-usable medium of claim 28, wherein, in the method, the focus error signal is generated from reflecting light from an optical disc onto an astigmatic photo sensor after passing the light through the lens at different distances of the lens from the optical disc, wherein the astigmatic photo sensor outputs different voltages respectively corresponding to the different distances of the lens from the optical disc.

33. The non-transitory computer-usable medium of claim 28, wherein the distances from the reference location to the lens correspond to offset points of the focus error signal.

34. The non-transitory computer-usable medium of claim 28, wherein the method further comprises:
using the determined relationship to set the lens at a position where the lens is defocused; and
forming a label on the surface of the disc using light from the light source that is passed through the defocused lens.

* * * * *

UNITED STATES PATENT AND TRADEMARK OFFICE
CERTIFICATE OF CORRECTION

| | | |
|---|---|---|
| PATENT NO. | : 7,768,878 B2 | Page 1 of 1 |
| APPLICATION NO. | : 11/179190 | |
| DATED | : August 3, 2010 | |
| INVENTOR(S) | : Darwin M. Hanks et al. | |

It is certified that error appears in the above-identified patent and that said Letters Patent is hereby corrected as shown below:

In column 10, line 24, in Claim 12, delete "references" and insert -- reference --, therefor.

In column 10, lines 49-50, in Claim 15, delete "references" and insert -- reference --, therefor.

In column 11, line 8, in Claim 21, delete "to" and insert -- the --, therefor.

In column 11, line 46, in Claim 24, delete "the" and insert -- a --, therefor.

In column 12, line 9, in Claim 28, after "A" insert -- non-transitory --.

Signed and Sealed this
Eighth Day of March, 2011

David J. Kappos
*Director of the United States Patent and Trademark Office*